No. 628,547. Patented July 11, 1899.
T. O. PERRY.
FLUID ACTUATED MOTOR FOR ACTUATING FLUID.
(Application filed July 11, 1898.)
(No Model.) 5 Sheets—Sheet 1.

Witnesses.
Edward T. Wray.
Bertha C. Sims.

Inventor.
Thos. O. Perry
by Burton & Burton
his Atty.

No. 628,547. Patented July 11, 1899.
T. O. PERRY.
FLUID ACTUATED MOTOR FOR ACTUATING FLUID.
(Application filed July 11, 1898.)
(No Model.) 5 Sheets—Sheet 2.

Witnesses.
Edward T. Wray.
Bertha C. Sims.

Inventor.
Thos. O. Perry
by Burton & Burton
his attys

No. 628,547. Patented July 11, 1899.
T. O. PERRY.
FLUID ACTUATED MOTOR FOR ACTUATING FLUID.
(Application filed July 11, 1898.)
(No Model.) 5 Sheets—Sheet 4.

Witnesses:
Edward T. Wray.
Bertha C. Sims.

Inventor:
Thos. O. Perry
by Burton and Burton
his attys.

UNITED STATES PATENT OFFICE.

THOMAS O. PERRY, OF CHICAGO, ILLINOIS.

FLUID-ACTUATED MOTOR FOR ACTUATING FLUID.

SPECIFICATION forming part of Letters Patent No. 628,547, dated July 11, 1899.

Application filed July 11, 1898. Serial No. 685,595. (No model.)

*To all whom it may concern:*

Be it known that I, THOMAS O. PERRY, a citizen of the United States, residing at Chicago, county of Cook, and State of Illinois, have invented certain new and useful Improvements in Fluid-Actuated Motors for Actuating Fluid, which are fully set forth in the following specification, reference being had to the accompanying drawings, forming a part thereof.

The purpose of this invention is to provide a motor or device for communicating power in which the power is derived from fluid-pressure and is exerted upon other fluid.

In the specific form in which I have illustrated my invention in the present application it is adapted to be used as a pneumatic water-elevator—that is to say, compressed air or other gas under tension of compression is the motive fluid and water is the fluid acted upon, and the action performed upon the water is its elevation. Details of the structure, however, are not necessarily limited to use in a pneumatic water-elevator, but constitute improvements upon former structures—such as, for example, that shown in my pending application, Serial No. 651,062, filed September 9, 1897—when adapted to other purposes than water elevation—as, for example, to the purpose of compressing air by means of water supplied under pressure.

This invention is an improvement upon and modification of the structure shown in my application Serial No. 651,062, intended to adapt it to the purposes of a water-elevator and at the same time embody detail improvements in the structure. Its general character may be described in substantially the same terms as the structure shown in said former application—that is to say, it comprises a plurality of air-chambers alternating with a like plurality of water-chambers, each cylindrical and all arranged in a cylindrical group alternating, as stated, in order along the axis of such cylindrical group and a like cylindrical group of valve-casings having air inlet and outlet ports leading to the air-chambers, respectively, and piston heads or valves in such valve-casings controlling the access of air to and its escape from the air-chambers, respectively. The water-chambers are separated from the air-chambers, respectively, by moving heads or diaphragms, which render both the air-chamber and the water-chamber collapsible and expansible by the movement of such heads, the air-chamber being expanded when the water-chamber associated with it is collapsed, and vice versa, and these moving heads or diaphragms are connected, respectively, to the piston-valves in the laterally-adjacent valve-casings, and the air-passage from said valve-casing controlled by said valves lead from the air-chambers, respectively, being so disposed that the valve which is operated by a given diaphragm controls the air-passage to air chamber or chambers other than that to which the diaphragm pertains.

A A A A are the water-chambers.

B B B B are the air-chambers.

C C C C are the moving heads or diaphragms, which intervene between each water-chamber and the air-chamber adjacent to it on one side, and D D D are fixed heads or partitions which intervene between the water-chambers, respectively, and the air-chambers adjacent on the other side.

D' is an upper fixed head, and D² is a lower fixed head, these two heads constituting the ends of the cylindrical group of air and water chambers.

E E E are valve-casings arranged end to end and constituting a cylindrical pile or group of chambers laterally adjacent to the cylindrical group of air and water chambers, and E' and E² are respectively the upper and lower caps or end pieces of the group of valve-casings, and either or both may have air inlet and outlet connections.

Figure 4:
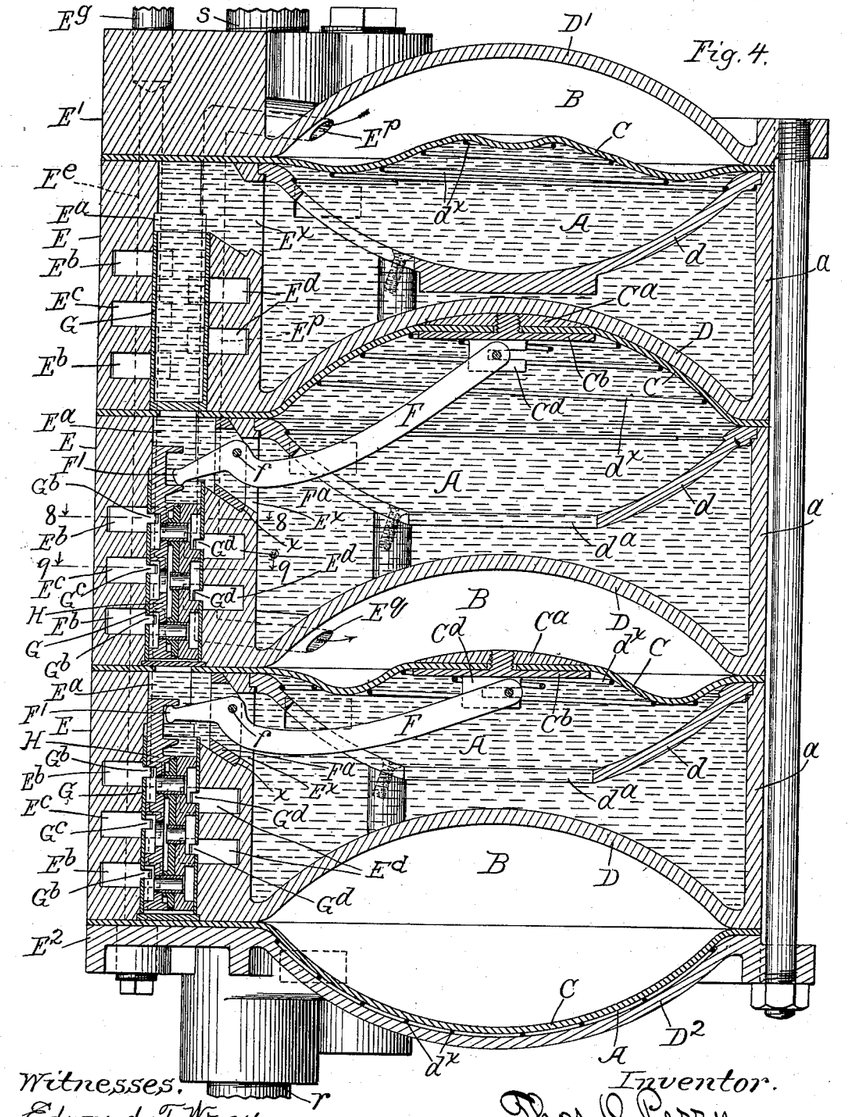
Fig. 4 is a section at the line 4 4 on Fig. 3.
Figure 5:
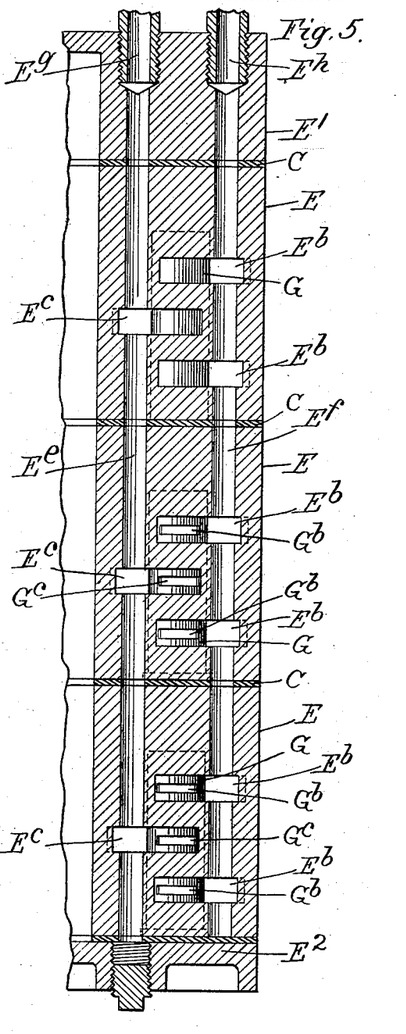
Fig. 5 is a section on the line 5 5 5 5 on Fig. 3.

As a matter of convenience and cheapness in the construction and assembling of the parts I cast integrally each fixed head D, cylindrical wall $a$ of the air-chamber longitudinally adjacent thereto, air-valve casing E laterally adjacent, and the casings, hereinafter described, of the water inlet and outlet valves and the contiguous portions of the water inlet and outlet passages, and I assemble as many such castings in a group end to end as there are air-chambers. I cast integrally the fixed head D' and the upper cap E' of the air-valve casing and the upper cap of the water-valve casing. I cast integrally also with the cap D² the lower end casting or cap E² of the air-valve casings and the lower cap of the water-valve casing. These five castings assembled conaxially—that is, the portions forming the water and air chambers being arranged conaxially and the several valve-casings and their caps or end castings being also arranged conaxially—constitute the entire body of the device, in which the air-controlling piston-valves, diaphragms, and the operating connections between the diaphragms and valves and also the water-controlling valves are mounted and assembled. Between the top fixed head D' and the adjacent upper margin of the wall $a$ of the air-chamber, which is formed integrally with the next head D' and in like manner between each head D and the adjacent upper margin of the next succeeding similar head there are interposed and securely bound open heads $d$ $d$ $d$ and above them flexible diaphragms C C C, the former being lodged in the rabbeted seats provided at the upper margin of the walls $a$ and the latter being clamped between the upper edge of said walls and the adjacent margin of the open heads on one side and the lower margin of the fixed heads on the other side, as seen in Fig. 4, and the sheet material of which these diaphragms are formed is extended to constitute packing in the same plane between the adjacent valve-casings. The two intermediate diaphragms are clamped at the center between the disks $C^a$ and $C^b$, the latter, which is on the lower side, having a lug $C^d$, to which is pivotally connected a lever F, designed to operate the piston-valve in the adjacent valve-casing. The two intermediate heads $d$ have a central aperture $d^a$ large enough to admit the disk $C^b$, said aperture constituting the main opening in said head through which water obtains access under the diaphragm. The diaphragm pertaining to the upper chamber has no lever attached to it, for reasons which will hereinafter appear, and the fixed head D' below this diaphragm, for like reasons, is without the central aperture $d^a$. In each of the water-chambers—that is, below each diaphragm—there is provided a spring $d^×$, which has its smallest and central coil adapted to encircle a boss at $C^d$ at the center of the disks $C^b$ and the coil-seats near the outer margin of the open head $d$, said head being recessed on the upper side to a depth equal to the diameter of the wire of which the spring is formed to provide a suitable seating-space for the spring when the diaphragm is depressed and the spring is collapsed. This spring tends to uphold the diaphragms, respectively, against the fixed heads D D', &c., being adapted to yield, however, with the diaphragm to the limit determined by the position of the open heads $d$, the spring, as stated, being accommodated between the diaphragm and said head $d$ at the collapsed position.

Figures 1, 2, 11, 12, 13:
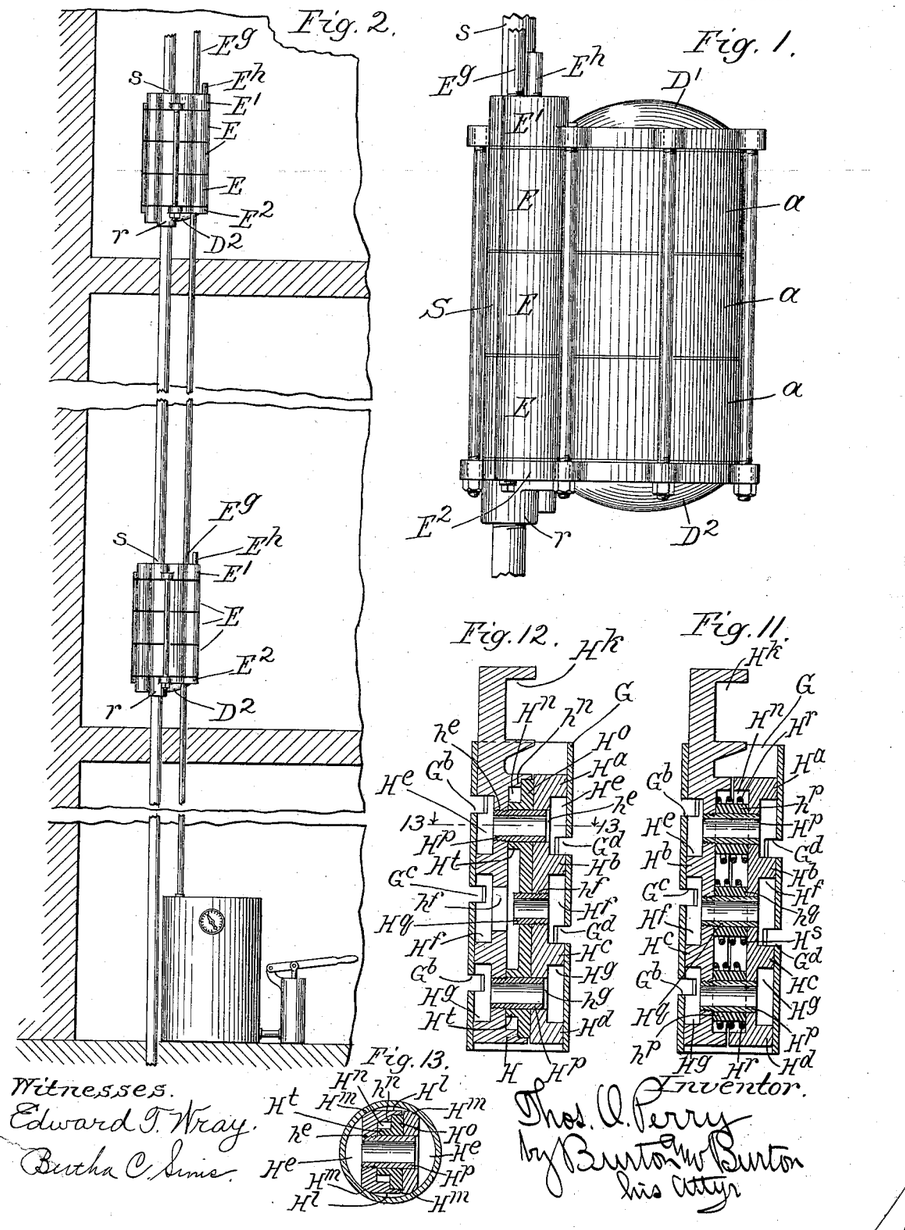
Figure 1 is a side elevation of my device on a reduced scale.
Fig. 2 is a diagrammatic view showing a plurality of water-elevators embodying my invention connected in a pipe system and in which each device is adapted to lift the water to the next succeeding one in the system.
Fig. 11 is an axial section of one form of valve for controlling the actuating fluid.
Fig. 12 is a similar section of a modified form of such valve, which is embodied in the principal figure.
Fig. 13 is a section at the line 13 13 on Fig. 12.
Figures 3, 8, 9, 10:
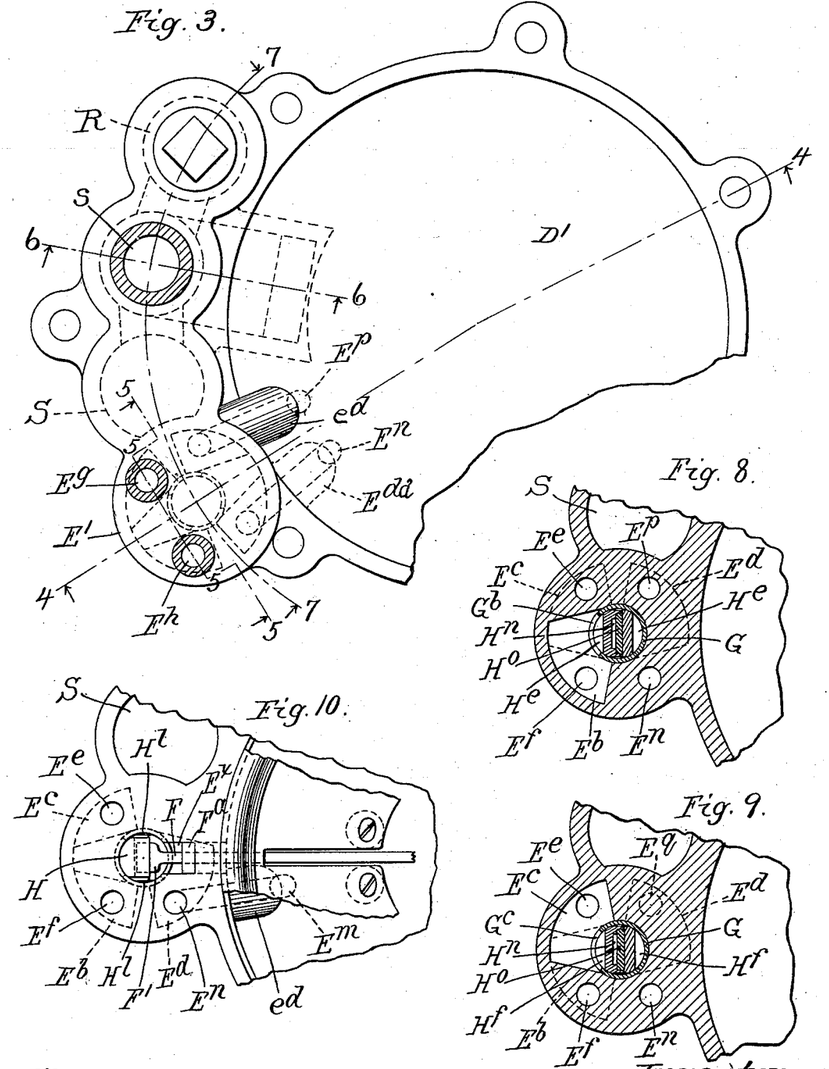
Fig. 3 is a top plan of my improved water-elevator.
Fig. 8 is a detail section at the line 8 8 on Fig. 4.
Fig. 9 is a detail section at the line 9 9 on Fig. 4.
Fig. 10 is a detail plan of one of the valve-casings and adjacent part of the fluid-chamber.
Figure 6:
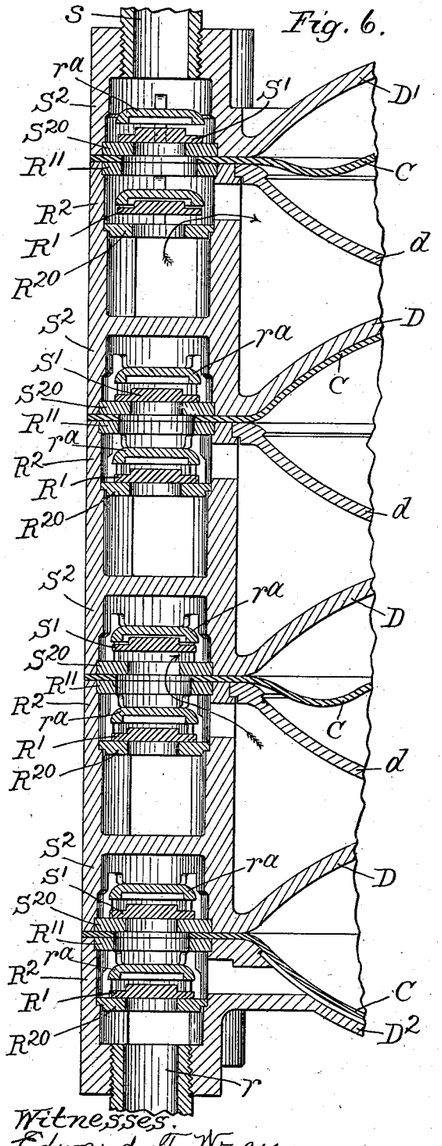
Fig. 6 is a section at the line 6 6 on Fig. 3.
Figure 7:
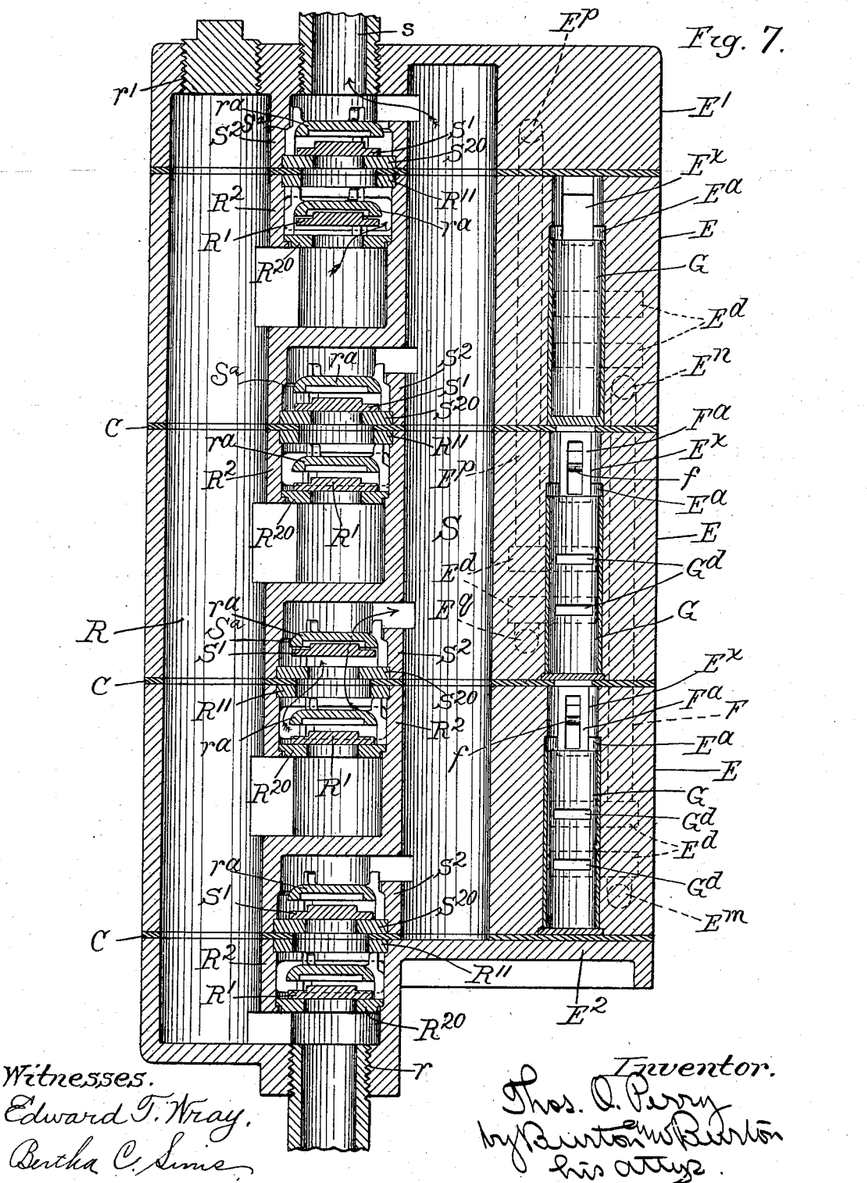
Fig. 7 is a detail section at the line 7 7 on Fig. 3.

Inlet and outlet valves for the several water-chambers are all of the same form and seated in valve-casings of the same form and arrangement relative to the communicating waterways. Their construction and arrangement are seen in Figs. 6 and 7, and their position with respect to the cylindrical pile or group of water and air chambers is seen in Figs. 2 and 3. The water-controlling valves for the several chambers are arranged in a cylindrical pile adjacent and parallel to the pile of air and water chambers and parallel, but not immediately adjacent to, the pile of cylindrical casings for the air-controlling valves, a continuous cylindrical chamber being interposed between said pile of water-controlling valves and the pile of air-controlling valves and a like continuous cylindrical chamber being provided at the opposite side of the pile of water-controlling valves. The first continuous chamber mentioned is the medium of communication by which the water passes to its final outlet or discharge and is termed the "outlet-passage" and the other continuous chamber being the medium of communication with the inlet or supply and being termed the "inlet-passage."

R is the inlet-passage, and S the outlet-passage, as above stated. I form integrally with each of the castings which comprises one of the heads D' the casings for a water inlet and outlet valve and the adjacent portions of the inlet and outlet passages R and S, and in the conaxial assembling of the air and water chambers, as described, the several casings of the water-controlling valves and their adjacent inlet and outlet passages are also assembled conaxially, as seen in Fig. 7. The casting which comprises the lower fixed head D² has formed integrally with it, however, the casing for an inlet-valve only, and the casting which comprises the upper fixed head D has formed integrally with it the casing for an outlet-valve only. R' R' R' are inlet-valves. S' S' S' are the outlet-valves. They are all check-valves and adapted to seat downward. R² R², &c., are inlet-valve casings. $S^2$ $S^2$, &c., are outlet-valve casings. $R^{20}$ $R^{20}$, &c., are inlet-valve seats. $S^{20}$ $S^{20}$, &c., are outlet-valve seats. The inlet-valve casings are formed at the upper end of the casting to which they pertain, and the outlet-valve casings are formed at the lower end of the casting, respectively, so that before the castings are assembled the valves can be entered in their respective casings, the inlet-valves being preceded by their seats $R^{20}$ and the outlet-valves being in similar manner followed by the insertion of their seats $S^{20}$. $R^a$ $R^a$, &c., are spiders which are inserted after the inlet-valves and before the outlet-valves, respectively, having wings $r^a$, which guide, center, and retain the valve within such limited range of movement that there is no danger of their displacement. This permits the making the valve very simple in form. $R^{11}$ are retaining-rings which are inserted above the spiders of the inlet-valves. The wings of these spiders, pressed at the upper end by the retaining-rings and resting at the lower end on the valve-seats $R^{20}$, hold the latter securely in place, and the spiders of the outlet-valves are stopped at the upper end by the shoulder $S^a$ on the casing.

The lower casting, comprising integrally with the cap $D^2$ the cap of the water-valve casings, has the threaded inlet $r$ in line with the pile of water-valves, but communicating with the inlet-passage R, which extends laterally adjacent to said pile. The upper casting, comprising integrally with the upper cap $D'$ the cap of the water-valve casings, has the water-outlet $s$ in line with the inlet $r$ and the water-valves, but communicating with the outlet-passage S, which extends laterally adjacent to the pile of valves on the side opposite the inlet-passage R. The latter passage has also an inlet $r'$ at the upper end, so that the device may be connected with or admit the supply at either end, as the situation may require. When it is set in the bottom of a well or cistern, the lower inlet $r$ will be plugged and the water admitted at the inlet $r'$. When the supply is derived from a service-pipe, such pipe may be connected at the lower end at the inlet $r$, and the delivery-pipe will then be attached at the outlet $s$ in direct line with the supply. The device may thus be interposed as a coupling between sections of a continuous service-pipe and employed to feed the water by steps to any height, employing air at only the necessary pressure to feed it one step—that is, from each of the feeding devices to the next. Such an arrangement is shown Fig. 2.

Each of the valve-casings E has an axial bore or cylindrical passage $E^a$ and lateral cavities $E^b$ $E^b$ and $E^c$ upon one side and lateral cavities $E^d$ $E^d$ on the other side, all these lateral cavities in the casting opening into the central or axial passage $E^a$. I line the axial passage $E^a$ with a brass tube G, which has ports corresponding in position to the mouths of the cavities $E^b$ $E^c$ $E^d$. This brass tubing constitutes a cylindrical seat for the piston-valve H, which comprises several piston heads or valves, as more particularly described hereinafter. The form of the cavities $E^b$ $E^c$, as seen in Figs. 8 and 9 in plan or as seen in transverse section through the valve-body, is in the form of a sector of an annulus less a portion cut off at one side, the mouth or opening at the axial passage extending through about one-third of the circumference of said passage. The form of cavity $E^c$, as seen in Fig. 9, is the reciprocal of that of the cavity $E^b$, being a portion of an annular sector less a portion cut away at the side opposite that at which the annular sector is mutilated to produce the form of the cavity $E^b$, and its mouth at the passage $E^a$ has the same circular extent about said passage, and its limits in the circumference of the passage $E^a$ are in line with the limits of the mouths of the passages $E^b$. This relation between the forms of the cavities $E^b$ and $E^c$, causing them to overhang one another, leaves them each with a portion with which no portion of the other is in line. When the several castings are assembled in the entire structure, as described, all the cavities $E^c$ in all the castings are connected by a passage $E^e$, which extends longitudinally parallel with the central passage $E^a$ and opens into the cavities $E^c$ at the part which is out of line with the cavities $E^b$, the part of the passage $E^e$ contained in each casting registering with the corresponding parts of said passage in the adjacent castings. This passage $E^e$ constitutes the air-inlet passage and leads to the air-inlet connection $E^g$ in the casting $E^1$. In like manner all the cavities $E^b$ in all the castings are connected by a passage $E^f$, made up of parts which extend longitudinally through each of the castings, registering with each other and connecting at the upper end of the upper casting with an air-outlet opening $E^h$. The cavities $E^d$ $E^d$ are in form similar to the cavities $E^b$ and $E^c$ and are formed in the casting by means of similar cores; but these cores are placed differently in the different castings in order to bring the cavities $E^d$ in the upper and lower casings E out of line at part of their extent with the corresponding cavities in the middle casting E in order that longitudinal passages may be formed, as hereinafter described, extending from the upper cavity $E^d$ of the lower casting E through the middle casting to suitable point of discharge into the second air-chamber without cutting or opening into the cavities $E^d$ in said middle casting, and that a passage in like manner may be formed leading from the upper cavity $E^d$ of the middle casting into and through the next casting $e^e$ above it to suitable discharge provided in the top casting into the uppermost air-chamber. The arrangement of these communicating passages may be varied; but that which is shown in Figs. 7, 8, and 9 and which will now be described will indicate the purpose to be served by whatsoever arrangement is adopted in any modification of this detail. From the upper cavity $E^d$ in the lowest casting E the passage $E^n$ extends through the upper portion of said lowest casing E and on through the entire extent of the middle casing E and into the next casting E above it and in said casing connects with a discharge through a boss $e^d$ into the second air-chamber B. From the lower cavity $E^d$ of the lowest casing E a passage $E^m$ is cut through the boss $e^d$ in that casing into the lowest air-chamber B. From the upper cavity $E^d$ of the middle casing E a passage $E^p$ is drilled, extending up through said casing E and on through the whole length of the next casing E above it and into the cap $E^l$, in which it extends horizontally through the boss $e^d$ in said cap-casting into the uppermost air-chamber B.

In the middle and lower casings E are piston-valves H H, each provided with four wings or piston-heads $H^a$ $H^b$ $H^c$ $H^d$, separated by segmental cavities $H^e$ $H^f$ $H^g$. These piston-heads are arranged with reference to the ports $G^b$, $G^b$, and $G^c$ in the lining-tube G, said ports leading from the cavities $E^b$ and $E^c$, respectively, so that in the range of movement of the entire piston-valve H, which is not sufficient to carry any of the piston-heads past or onto any of the ports $E^b$, $E^b$, or $E^c$, the intermediate piston-heads $H^b$ $H^c$ may travel from one side to the opposite side of the ports $G^d$, and said piston-heads are of such a width that for an instant they completely close said ports in passing them. The body of the valve H is apertured transversely between the consecutive seats, forming thus three apertures—$h^e$ between the piston-heads $H^a$ and $H^b$, $h^f$ between $H^b$ and $H^c$, and $h^g$ between $H^c$ and $H^d$. With this construction it will be seen that when the valve is reciprocated as above described the communication of each of the ports $G^d$ $G^d$ and chambers $E^d$ $E^d$ is made to alternate between the inlet and outlet ports, so that the fluid is alternately admitted to and discharged from the chamber B, with which the chamber $E^d$ of the valve-casing communicates. Also it will be noticed that in such reciprocation one of the chambers $E^d$ is connected with the outlet and the other with the inlet, and from the foregoing description it will be seen that one of said chambers $E^d$ leads to the chamber B next preceding the one whose diaphragm actuates the valve, while the other of said chambers $E^d$ leads to the chamber B next following the one whose diaphragm actuates the valve.

The fulcrum of the lever F, by which the diaphragm communicates motion to the valve, is in each case provided in a standard $F^a$, through which the lever extends and to which it is pivoted by a pin $f$. This standard is lodged in the passage $E^x$, cut through the casing E from the central passage $E^a$, in which the valve reciprocates into the water-chamber A, the lower side or bottom of said passage being formed aslant with a shoulder or stop $x$, and the lower side or foot of the standard $F^a$ is at an angle to the vertical edges corresponding to the slant of the bottom of the passage $E^x$, so that said standard after the lever has been inserted between its lugs and secured by the pivot-pin may be introduced into the passage $E^x$ from the end of the casing E and lodged on the slanting bottom and against the shoulder $x$ and be thereby definitely stopped, the pivot-pin being retained against possibility of escape by the narrowness of the aperture in which the standard is thus lodged, while the upper end of the standard is stopped by the next succeeding casting above or by the packing which intervenes. The lever F engages the valve H by means of the nose $F^1$, which enters the transverse channel $H^k$, formed across the valve H toward the upper end. The width of the channel $H^k$ is such as to allow a certain range of movement to the lever between the two shoulders of the channel, and the square end of the nose $F^1$, abutting against the square bottom of the channel $H^k$, with only sufficient room for play to accommodate the movement of the lever about its fixed fulcrum, prevents rotation of the valve H in its seat. The prevention of such rotation is made necessary by a feature of construction which will now be explained. In order that the water-pressure to which the valve is exposed at the end at which the lever reaches and engages it (the water having necessarily free access from the chamber A through the aperture made for the valve) may be transmitted to the opposite end, so as to be balanced and deprived of any power of moving the valve endwise, I form at opposite sides of the valve shallow longitudinal channels $H^l$ $H^l$. These channels are not wide enough to cut off the seating-surface of the valve between the opposite segmental cavities $H^e$ $H^f$ $H^g$, which separate the consecutive heads $H^a$ $H^b$, &c.; but, on the contrary, there is left between said cavities and longitudinal channels seating-surfaces $H^m$ $H^m$, and the ports $G^b$, $G^b$, $G^c$, and $G^d$ in the lining G are not extended circumferentially farther than is necessary to correspond with said segmental cavities of the valve. By this means the communication from one side to the other of the valve is limited to the apertures $h^e$, $h^f$, and $h^g$, which extend through the valve-body, connecting opposite segmental cavities, respectively, so long as the valve is not allowed to rotate in its seat, so as to bring the ports $G^b$ $B^c$ $G^d$ across the longitudinal passages $H^l$ $H^l$. I adopt this construction—that is, with the longitudinal channels for the passage of water from end to end of the valve and segmental instead of complete annular cavities between the piston-heads—in order that I may make provision for the expansion of the valve to take up wear. This is accomplished by dividing the valve longitudinally at a plane transverse to the direction of the ducts $h^e$, $h^f$, and $h^g$ and interposing between the divided parts any suitable spring tending to hold them apart and against the opposite sides, respectively, of the valve-casing, and to connect the severed portions of the transverse ducts $h^e$, $h^f$, and $h^g$ I insert short tubes, which extend fluid-tight across the plane of division, so that the fluid may pass from one side to the other of the valve through the transverse fluid-ways without leakage at the longitudinal rift. This result may be accomplished by the structure shown in Fig. 13, in which there is shown a cavity $H^n$, formed so as to open at the divisional plane between the two parts of the divided valve, the extent of such cavity being sufficient to take in all the said fluid-ways, and the portions of said apertures respectively contained in the two divided parts of the valve being connected by short tubes $H^p$, $H^p$, and $H^q$, which are made to constitute sealed passage-ways across the cavity by means of short rubber tubes $h^p$ and $h^q$, which fit snugly about the tubes and abut endwise snugly against the opposite faces of the divided members of the valve, so that when said members are forced together in order to enter the casing perfect seating of the ends of the rubber tubes against the faces of the valve-body occurs. In this construction the tubes $h^p$ and $h^q$ also perform the function of springs, having a tendency to force the two divided members of the valve apart; but in order both to retain the rubber tubes seated fluid-tight about the surface of the metal tubes and to serve more efficiently the purpose of forcing the two members of the valve apart spiral springs $H^r$ and $H^s$ may be coiled about the rubber tubes and seated endwise against the opposed faces of the divided members of the valve. It is desirable, however, that the spreading of the divided valve to keep it suitably seated against opposite sides of the casing should be effected by means of the pressure of the fluid which the valve controls, because when such spreading and consequent seating of the valve in the casing are dependent upon the action of a spring device the tension of the spring or springs employed must be sufficient to effect this purpose adequately for all pressures of the fluid, and a spring strong enough to accomplish this result properly when the fluid-pressure is high might cause the valve to operate with too much friction in the casing to be sufficiently sensitive when the device is operating with fluid at very low pressure. In order, therefore, to provide for the extension of the valve in this more desirable manner—to wit, by the pressure of the fluid controlled—I make the longitudinal division of the valve at the plane of the lateral edges at one side of the channels $H^1$ and I form the cavity $H^n$ wholly in the larger segment or member of the divided valve, which after this division contains the rabbets which constitute the channels $H^1$. Into this cavity I fit a compressible and suitable resilient packing $H^o$, which may be held off from the bottom of the cavity either by a small shoulder $h^n$, which may be formed around the margin, or by rubber rings $H^t$, lodged around the tubes $H^p$ $H^p$, respectively, or by both, thus inclosing a shallow chamber $h^n$ behind the packing. Into the apertures $h^e$ and $h^g$ in this half of the valve I solder or otherwise permanently unite the short tubes $H^p$ $H^p$ for the outlet-passages, and they connect through the rubber packing, which is suitably apertured for the purpose, and through the apertures $h^e$ and $h^g$ in the smaller segment of the valve. The rubber fits water-tight around the short tubes $H^p$; but said tubes need not fit water-tight where they extend through the apertures in the smaller segment of the valve. Into the aperture $h^f$ of said smaller segment of the valve I secure similarly a short tube $H^q$. This tube, however, is only long enough to extend through the rubber which it apertures, so as to fit water-tight around it, but not into the aperture $h^f$ in the larger segment of the valve. With this construction it will be seen that the inlet-pressure derived through the chamber $E^c$ obtains access to the cavity $h^n$ behind the packing $H^o$. It operates with a tendency to press the packing tightly against the face of the smaller segment of the valve, which covers and faces the packing on the side opposite said cavity $h^n$, at the same time crowding the packing edgewise against the lateral walls of the cavity, in which it is seated, and against the three tubes $H^p$ $H^p$ and $H^q$, thus making the valve operate as if it were solid to the extent of preventing transmission of fluid or fluid-pressure from one side to the other otherwise than through the transverse ports $h^e$, $h^f$, and $h^g$. At the same time not only the original elastic expansibility of the packing, which may be thick enough to require slight compression when first inserted in order to bring the two members of the valve together and adapt the valve as a whole to enter the tube G, but also the fluid-pressure derived from the inlet-port, tends to keep the two parts of the valve constantly pressed in opposite directions against the inner surface of the tube, so that the effect of any wear is prevented and the valve is kept constantly tight in its seat. The same feature—to wit, the constant outward pressure exerted upon the two members of the divided valve—prevents the valve from settling by gravity in its seat, friction being always amply sufficient for this purpose.

The operation of this structure may be understood from the description of the same to be as follows: The inlet connection $E^g$ being connected with a source of compressed air and the pipe R being connected with a source of water-supply, the pipe S being connected with the system to be supplied, assuming that in one of the chambers—as, for example, the second from the top—the diaphragm C is close against the upper partition-wall D, the water-chamber below it being full of water, the valve operated by the lever F, connected with that diaphragm, being in the position shown in Fig. 4, admits compressed air by way of the chamber $E^c$ in the valve-casing, ports of the valve with which that chamber communicates, lower chamber $E^d$ at the opposite side of the casing, and duct $E^q$ to the air-chamber above the next lower diaphragm C. Admission of air to this air-chamber depresses that diaphragm, expelling the water from the water-chamber below it, causing the lever F, connected with said diaphragm, to actuate the valve in the lowermost casing and lifting it ultimately to a position at which the inlet-chamber $E^c$ communicates by way of the proper ports of the valve with the upper chamber $G^d$ of the valve-casing, and thence by way of the passage $E^n$ with the lower chamber $E^d$ of the uppermost casing, and thence with the air-chamber above the second diaphragm, causing that diaphragm to be depressed and the lever F, connected therewith, to actuate the valve in the middle casing, carrying it to its uppermost position and establishing communication from the inlet-chamber $E^c$ through the proper port of the valve to the upper chamber $G^d$ at the opposite side of the casing, and thence by way of the passage $E^p$ to the chamber above the uppermost diaphragm, causing it to be depressed and expel the water from the water-chamber below it. The same action of this valve has opened communication through the passage $E^q$ from the air-chamber above the third diaphragm from the top with the lower chamber $E^d$ of the middle valve-casing, which is by such movement of the valve brought into communication with the outlet-port $E^f$, so that the water passing into the air-chamber below said third diaphragm and lifting said diaphragm causes it to actuate the lever F, connected to it, in a direction to move downward the valve in the lowest casing, leaving it at the position shown in Fig. 4, with the air in the chamber $E^c$ communicating by way of the valve-ports with the lower chamber $E^g$ in that casing, and thence by the duct $E^m$ with the air-chamber above the lowest diaphragm, causing it to be depressed and expel the water from the water-chamber below it. The same movement of this valve puts the upper chamber $G^d$ of this casing in communication with the upper outlet $E^b$, and said upper chamber $G^d$ being in communication by way of the duct $E^n$ with the air-chamber above the second diaphragm the air is thereby permitted to escape from that air-chamber, the water below the diaphragm therein lifting the latter and causing the lever to restore the valve in the second casing to the position assumed at starting. The cycle of operation of the diaphragms and valves throughout the series of chambers is thus completed, each diaphragm having in turn been exposed to the action of compressed air and caused to force the water out of the water-chamber below it and then relieved from the pressure of the air and forced upward by the water entering the water-chamber, the admission of compressed air above each diaphragm having been effected by the movement of a valve connected to a different diaphragm of the series. In this process the action of the valves controlling the water is automatic and obvious from the structure and need not be further explained.

I claim—

1. In a fluid-actuating motor for actuating fluid, the combination of a plurality of chambered bodies, coaxially arranged; rigid heads interposed between each two consecutive chambered bodies and rigid heads closing the outer ends of the extreme chambered bodies of the group; and moving heads or diaphragms partitioning the space inclosed between the fixed heads, and thereby forming chambers in couples, one chamber of each couple being for the actuating fluid and the other for the actuated fluid; inlet and outlet valves for the actuating-fluid chambers, and inlet and outlet valves for the actuated-fluid chambers; mechanical connections from the moving heads or diaphragms to the valves for controlling the actuating fluid, such valves pertaining to one actuating-fluid chamber being connected to and actuated by the moving head or diaphragm pertaining to the next couple.

2. In a pneumatic water-elevator comprising a plurality of chambered bodies having each an open end and a fixed head closing the opposite end, and having a moving head or diaphragm between the ends inclosing an air-chamber between itself and the fixed head, such chambered bodies being assembled, the closed end of one to the open end of the next, whereby a water-chamber is inclosed between the fixed head of one chambered body and the movable head or diaphragm of the next; suitable air inlet and outlet valves for the air-chambers and water inlet and outlet valves for the water-chambers, and mechanical connections from the moving heads to the air-controlling valves, respectively, such valves pertaining to one air-chamber being actuated by the moving head pertaining to the other.

3. In combination with the air-chambers, the valve-casings having coaxial valve-seats and air-controlling piston-valves therein, said valve-casings having inlet and outlet ports, and having other ports leading to the air-chambers respectively; mechanical connections for the valves respectively connected to and actuated by the diaphragm of an air-chamber with which the ports controlled by such valve do not communicate.

4. In combination with the air-chambers, valve-casings provided with coaxial valve-seats and communications therefrom to the air-chambers respectively, and the piston-valves which control such communication, said casings having lateral inlet and outlet cavities opening through the valve-seat at the same side thereof; the inlet-cavities extending in one circumferential direction farther than the outlet-cavities, and the outlet-cavities extending in the other circumferential direction farther than the inlet-cavities; a longitudinal passage connecting all the inlet-cavities where they extend beyond the outlet-cavities, and a longitudinal passage connecting all the outlet-cavities where they extend beyond the inlet-cavities.

5. In combination, the air-chambers coaxially arranged; the valve-casings adjacent thereto respectively, and the valves operating therein, said casings having each an air-communicating passage leading into the adjacent air-chamber and having a cavity $E^d$ communicating with the valve-seat, and a duct leading from such cavity to the air-communicating passage of another valve-casing of the series.

6. In a fluid-actuated motor for actuating a fluid, in combination with a plurality of expanding and collapsing chambers, the device which controls the flow of fluid to cause their expansion and collapse comprising a valve-casing having inlet and outlet ports at one side and having ports at the other side which lead respectively to two non-adjacent expanding and collapsing chambers; a piston-valve having wings separated by segmental cavities at opposite sides, and apertured transversely to effect communication between such opposite cavities, two of said wings being located so that they seat respectively longitudinally beyond the outlet and beyond the inlet ports, other wings being located so that they seat between the inlet and outlet ports, the ports leading to the non-adjacent chambers being located opposite the intervals between the inlet and outlet ports.

7. In a fluid-actuated device, to control the flow of the motive fluid, a sliding valve and its casing having lateral ports which the valve controls, the valve being longitudinally divided and having transverse fluid-ways, and tubes in the fluid-ways extending across the plane of division of the valve and entering the two parts thereof and made fluid-tight therewith, combined with suitable spring reacting between the parts of the divided valve to hold them against the walls of the casing.

8. In a fluid-actuated device for the purpose of controlling the flow of the motive fluid; a sliding valve and its casing having lateral ports which the valve controls, the valve being longitudinally divided and having a cavity adjacent to and opening at the plane of division and having fluid-ways which extend through the valve transverse to said plane within the boundary of such cavity, said fluid-ways comprising rigid tubes which make fluid-tight connection at one end with one of the two divided parts of the valve, in combination with an elastically-compressible packing lodged in and abutting edgewise against the entire margin of said cavity and penetrated by said tubes and embracing the same closely, whereby the motive fluid gains access under said packing in the cavity in which the same is lodged and tends to force the parts of the divided valve apart against the walls of the casing and simultaneously to seat said packing water-tight at its entire margin and about the tubes.

9. In a fluid-actuated device for the purpose of controlling the flow of the motive fluid; a sliding valve and its casing having lateral ports which the valve controls, the valve being longitudinally divided and having a cavity adjacent to and opening at the plane of division and having fluid-ways which extend through the valve transverse to said plane within the boundary of such cavity, said fluid-ways comprising rigid tubes which make fluid-tight connection at one end with one of the two divided parts of the valve, in combination with an elastically-compressible packing lodged in and abutting edgewise against the entire margin of said cavity and penetrated by said tubes and embracing the same closely; alternate tubes having their fluid-tight junction with one of the parts of the divided valve, and the other alternate tubes having such junction at the opposite part.

10. In a fluid-actuated device for the purpose of controlling the flow of the motive fluid, a sliding valve and its casing having lateral ports which the valve controls, the valve being longitudinally divided and having transverse fluid-ways; rigid tubes which extend across the plane of division in the fluid-ways; and elastically-compressible packing encompassing the rigid tubes respectively being water-tight thereon and bearing against the facing surfaces of the divided valve, whereby the packing is adapted both to render water-tight the connection of the tubes with the divided parts of the valve at the fluid-ways, and also to act as a spring to force the parts of said divided valve against the casing.

11. In combination with a valve-casing having a cylindrical chamber, and lateral inlet and outlet ports into said chamber; a piston-valve adapted to reciprocate in such cylindrical chamber and having wings or piston-heads longitudinally separated by segmental cavities, and transversely pierced to connect opposite cavities, such valve being longitudinally divided at a plane between the segmental cavities on the one side and those upon the opposite side, and provided with a cavity opening from the divisional plane, and a packing lodged in and abutting edgewise about the entire margin of said cavity, and apertured in line with the apertures which connect the opposite segmental cavities of the valve.

12. In combination with a valve-casing having a cylindrical chamber, and lateral inlet and outlet ports into said chamber; a piston-valve adapted to reciprocate in such cylindrical chamber and having wings or pistonheads longitudinally separated by segmental cavities, and transversely pierced to connect opposite cavities, such valve being longitudinally divided at a plane between the segmental cavities on the one side and those upon the opposite side, and provided with a cavity opening from the divisional plane, and a packing lodged in and adapted to fully occupy said cavity, and apertured in line with the apertures which connect the opposite segmental cavities of the valve; tubes extending through the packing at said several apertures, alternate tubes being connected water-tight at one end in one of the valve-segments, and alternate tubes being similarly connected at the opposite end in the other segment, whereby communication between consecutive segmental cavities on the same side is prevented.

13. In combination with a valve-casing having a cylindrical chamber and inlet and outlet ports opening through its cylindrical wall; a valve adapted to reciprocate in said chamber, and having wings or flanges separated by segmental cavities and adapted to seat between and at opposite sides of the ports respectively; opposite segmental cavities being connected by an aperture through the valve, said valve having a longitudinal channel extending from end to end on its surface between the opposite segmental cavities, and divided longitudinally from end to end at the plane coinciding with one edge of such channel, the segment which contains the channel having a recess or cavity in the face at the divisional plane, and a packing lodged in and occupying fully said cavity and apertured coincidentally with the transverse apertures which connect opposite segmental cavites.

14. In combination with a valve-casing having a cylindrical chamber and inlet and outlet ports opening through its cylindrical wall, a valve adapted to reciprocate in said chamber and having wings or flanges separated by segmental cavities and adapted to seat between and at opposite sides of the ports respectively, opposite segmental cavities being connected by an aperture through the valve, the valve having a longitudinal channel extending from end to end on its surface between the opposite segmental cavities, and divided longitudinally from end to end at the plane coinciding with one edge of such channel, the segment which contains the channel having a recess or cavity in the face at the divisional plane, the bottom of such cavity having a marginal shoulder extending on all sides, and a packing lodged in such cavity and seated on such shoulder and fully occupying the cavity from said shoulder to the plane of the divisional face, whereby an unoccupied chamber is formed behind or under such packing from the plane of the shoulder to the back of the cavity; the packing being apertured coincidentally with the aperture which connects the opposite segmental cavities.

15. In combination with a valve-casing having a cylindrical chamber and inlet and outlet ports opening through its cylindrical wall; a valve adapted to reciprocate in said chamber and having wings or flanges separated by segmental cavities and adapted to seat between and at opposite sides of the ports respectively; opposite segmental cavities being connected by an aperture through the valve; the valve having a longitudinal channel extending from end to end on its surface between the opposite segmental cavities, and divided longitudinally from end to end at the plane coinciding with one edge of such channel, the segment which contains the channel having a recess or cavity in the face at the divisional plane; the bottom of such cavity having a marginal shoulder extending on all sides, and a packing lodged in such cavity and seated on such shoulder and fully occupying the cavity from said shoulder to the plane of the divisional face, whereby an unoccupied chamber is formed behind or under such packing from the plane of the shoulder to the back of the cavity, the packing being apertured coincidentally with the aperture which connects the opposite segmental cavities; the extreme ones of said apertures being provided with short tubes rooted air-tight in the apertures of the segment having the packed cavity, and extending entirely through the packing and into the aperture of the other segment, and an intermediate one of said apertures having a similar short tube rooted air-tight in the other segment and extending through the packing only, and terminating open in the unoccupied cavity under the packing.

16. In a pneumatic water-elevator, in combination with the conaxial group of air and water chambers, and the corresponding adjacent conaxial group of water-controlling valves; a water-inlet passage adjacent at one side to the group of valve-casings, said water-inlet passage having lateral ports leading to the ends of said conaxial group of water-controlling valves, and provided with suitable connections for a water-pipe at opposite ends in line with each other parallel to the axial line of the group of water-controlling valves, whereby such device is adapted to be interposed at intervals in a continuous run of water-pipe to elevate the water by stages.

17. In a fluid-motor for actuating a fluid, the combination of a plurality of chambers for the actuating fluid, alternating with a like plurality of chambers for the actuated fluid, the actuating-fluid chambers being separated from the corresponding actuated-fluid chambers respectively by flexible diaphragms; suitable valves for controlling the inlet and outlet of the actuating and actuated fluids respectively; and a spirally-coiled spring in the actuated-fluid chamber, having its several coils constructed and arranged to bear upon the surface of the diaphragm, whereby the diaphragm is supported and reactuated at a multiplicity of points between its circumference and center.

In testimony whereof I have hereunto set my hand, in the presence of two witnesses, at Chicago, Illinois, this 7th day of July, 1898.

THOMAS O. PERRY.

Witnesses:
 CHAS. S. BURTON,
 BERTHA C. SIMS.